(12) United States Patent
Pounds (10) Patent No.: US 10,394,240 B1
(45) Date of Patent: Aug. 27, 2019

(54) FAILOVER NAVIGATION FOR REMOTELY OPERATED AERIAL VEHICLES

(71) Applicant: Olaeris, Inc, Fort Worth, TX (US)

(72) Inventor: Paul E. I. Pounds, Brisbane (AU)

(73) Assignee: Olaeris, Inc., Burleson, TX (US)

( * ) Notice: Subject to any disclaimer, the term of this patent is extended or adjusted under 35 U.S.C. 154(b) by 71 days.

(21) Appl. No.: 15/499,788

(22) Filed: Apr. 27, 2017

Related U.S. Application Data (60) Provisional application No. 62/333,135, filed on May 6, 2016.

(51) Int. Cl.
| | |
|---|---|
| *G06F 19/00* | (2018.01) |
| *G05D 1/00* | (2006.01) |
| *G08G 5/00* | (2006.01) |
| *G08G 5/04* | (2006.01) |
| *B64C 39/02* | (2006.01) |

(52) U.S. Cl.
CPC ......... *G05D 1/0088* (2013.01); *B64C 39/024* (2013.01); *G08G 5/0039* (2013.01); *G08G 5/0069* (2013.01); *G08G 5/045* (2013.01); *B64C 2201/108* (2013.01); *B64C 2201/146* (2013.01)

(58) Field of Classification Search
CPC ............... G05D 1/0088; B64C 39/024; B64C 2201/108; B64C 2201/146; G08G 5/0039; G08G 5/0069; G08G 5/045
USPC ....................................................... 701/1, 3
See application file for complete search history.

(56) References Cited

U.S. PATENT DOCUMENTS

| | | | | |
|---|---|---|---|---|
| 9,886,794 | B2* | 2/2018 | van Os | G01C 21/00 |
| 2005/0004723 | A1* | 1/2005 | Duggan | G05D 1/0061 |
| | | | | 701/24 |
| 2008/0158256 | A1* | 7/2008 | Russell | G06T 7/32 |
| | | | | 345/629 |
| 2009/0087029 | A1* | 4/2009 | Coleman | G06K 9/00208 |
| | | | | 382/103 |
| 2009/0132316 | A1* | 5/2009 | Florance | G06Q 30/06 |
| | | | | 701/532 |
| 2010/0268458 | A1* | 10/2010 | Becker | G01C 23/00 |
| | | | | 701/532 |
| 2012/0190386 | A1* | 7/2012 | Anderson | G01C 15/04 |
| | | | | 455/456.3 |
| 2013/0073388 | A1* | 3/2013 | Heath | G06Q 30/02 |
| | | | | 705/14.53 |
| 2013/0314694 | A1* | 11/2013 | Tchoryk, Jr. | G01S 17/95 |
| | | | | 356/28.5 |
| 2013/0325343 | A1* | 12/2013 | Blumenberg | G01C 21/00 |
| | | | | 701/533 |

(Continued)

*Primary Examiner* — Ronnie M Mancho
(74) *Attorney, Agent, or Firm* — Michael B. Dodd (57) ABSTRACT

The present invention extends to methods, systems, devices, and apparatus for failover navigation for remotely operated aerial vehicles. During flight, a primary guidance system uses a higher resolution map for an area to guide a remotely operated aerial vehicle around obstacles (e.g., buildings) in the area. Failure of the primary guidance system is detected during flight. The remotely operated aerial vehicle switches over to a secondary guidance system in response to detecting the failure. The secondary guidance system formulates a flight path to a safer location based on a lower resolution map of the area. The formulated flight path minimizes crossings between different boundaries represented in the lower resolution map. The formulated flight path is biased towards safety over efficiency.

20 Claims, 4 Drawing Sheets

(56) References Cited

U.S. PATENT DOCUMENTS

| | | | | |
|---|---|---|---|---|
| 2013/0326380 | A1* | 12/2013 | Lai | G06F 3/0481 |
| | | | | 715/765 |
| 2013/0326384 | A1* | 12/2013 | Moore | G01C 21/3638 |
| | | | | 715/771 |
| 2013/0326407 | A1* | 12/2013 | van Os | G01C 21/00 |
| | | | | 715/810 |
| 2013/0326425 | A1* | 12/2013 | Forstall | G01C 21/3638 |
| | | | | 715/851 |
| 2013/0335566 | A1* | 12/2013 | Coulter | H04N 7/181 |
| | | | | 348/144 |
| 2014/0006129 | A1* | 1/2014 | Heath | G06Q 30/0222 |
| | | | | 705/14.23 |
| 2015/0334545 | A1* | 11/2015 | Maier | H04W 4/70 |
| | | | | 455/404.2 |
| 2016/0070265 | A1* | 3/2016 | Liu | B64C 39/024 |
| | | | | 701/3 |
| 2016/0275801 | A1* | 9/2016 | Kopardekar | G08G 5/0043 |
| 2016/0306824 | A1* | 10/2016 | Lopez | G06T 3/4092 |
| 2016/0314127 | A1* | 10/2016 | Har-Noy | G06F 17/30268 |
| 2016/0371984 | A1* | 12/2016 | Macfarlane | G01C 21/20 |
| 2017/0150308 | A1* | 5/2017 | Jones | H04W 4/021 |

\* cited by examiner

FAILOVER NAVIGATION FOR REMOTELY OPERATED AERIAL VEHICLES

CROSS-REFERENCE TO RELATED APPLICATIONS

This application claims the benefit of and priority to U.S. Provisional Patent Application Ser. No. 62/333,135 entitled "Failover Navigation For Remotely Operated Aerial Vehicles", filed May 6, 2016 by Paul E. I. Pounds, the entire contents of which are expressly incorporated by reference.

BACKGROUND

1. Background and Relevant Art

The number of remotely operated (e.g., piloted) aerial vehicles, including unmanned aerial vehicles (UAVs), being flown continues to increase. A variety of different entities including hobbyists, delivery companies, intelligence agencies, surveyors, power companies, etc. use Remotely Operated Aerial Vehicles. Some Remotely Operated Aerial Vehicles operate past line of sight. On an ongoing basis and/or at a destination, the Remotely Operated Aerial Vehicle provides images and/or video of its surroundings back to a monitoring system (which may or may not be the location of the operator). The Remotely Operated Aerial Vehicle can also perform other activities, such as, delivering a package. Hobbyists typically use UAVs within line of sight as a recreational activity. These UAVs may or may not provide images and/or video back to the operator.

In most operating environments, a Remotely Operated Aerial Vehicle can be launched from a launch location accessible to the operator (e.g., hobbyist or pilot) and/or maintenance personnel. The Remotely Operated Aerial Vehicle is flown for some amount of time or to complete a specified mission. The Remotely Operated Aerial Vehicle is then flown to a landing location (which may or may not be the same as the launch location) and lands.

Some Remotely Operated Aerial Vehicles may also operate autonomously and/or in communication with a computer system. For example, a Remotely Operated Aerial Vehicle can be programmed to follow a designated path between different sets of coordinates. In some environments, a standby pilot can monitor a Remotely Operated Aerial Vehicle during autonomous or computer controlled flight. When appropriate (e.g., due to component failures, weather conditions, etc.), the pilot can disrupt autonomous flight and assume control of the Remotely Operated Aerial Vehicle. As such, the pilot may be able to safely land a Remotely Operated Aerial Vehicle when autonomous or computer controlled flight becomes unsafe.

BRIEF SUMMARY

The present invention extends to methods, systems, devices, apparatus, and computer program products for failover navigation for remotely operated aerial vehicles. In one aspect, either of a primary flight guidance system and a secondary flight guidance system can be used to fly (and are potentially co-located with) a remotely operated aerial vehicle (e.g., an Unmanned Aerial Vehicle ("UAV")). The primary flight guidance system utilizes processor resources and memory resources for processing higher resolution maps. The secondary flight guidance system utilizes processor resources and memory resources for processing lower resolution maps. In one aspect, the secondary processor resources have reduced capabilities relative to the processor resources and the secondary memory resources have reduced capabilities relative to the memory resources.

Prior to flight, a higher resolution map for an area is loaded into the primary flight guidance system. The higher resolution map includes more detailed boundary geometry for one or more obstacles in the area. A lower resolution map for the area is loaded into the secondary flight guidance system. The lower resolution map includes less detailed boundary geometry for the one or more obstacles in the area.

The primary flight guidance system is used (e.g., either locally or remotely, for example, via a control station) to fly the remotely operated aerial vehicle within the area that includes the one or more obstacles. The primarily flight guidance system refers to the higher resolution map to navigate the one or more obstacles. Failure of the primary flight guidance system is detected. Flight guidance is switched to the secondary flight guidance system.

The secondary flight guidance system is used (e.g., either locally or remotely, for example, via a control station) to formulate a flight path to a safer location outside of the area. The secondary flight guidance system refers to the lower resolution map to formulate the flight path. The flight path minimizing crossings between boundaries defined in the less detailed boundary geometry to bias the flight path towards safety over efficiency.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

The specific features, aspects and advantages of the present invention will become better understood with regard to the following description and accompanying drawings where.

DETAILED DESCRIPTION

The present invention extends to methods, systems, devices, apparatus, and computer program products for failover navigation for remotely operated aerial vehicles. In one aspect, either of a primary flight guidance system and a secondary flight guidance system can be to fly (and are potentially co-located with) a remotely operated aerial vehicle (e.g., an Unmanned Aerial Vehicle ("UAV")). The primary flight guidance system utilizes processor resources and memory resources for processing higher resolution maps. The secondary flight guidance system utilizes processor resources and memory resources for processing lower resolution maps. In one aspect, the secondary processor resources have reduced capabilities relative to the processor resources and the secondary memory resources have reduced capabilities relative to the memory resources.

Prior to flight, a higher resolution map for an area is loaded into the primary flight guidance system. The higher resolution map includes more detailed boundary geometry for one or more obstacles in the area. A lower resolution map for the area is loaded into the secondary flight guidance system. The lower resolution map includes less detailed boundary geometry for the one or more obstacles in the area.

The primary flight guidance system is used (e.g., either locally or remotely, for example, via a control station) to fly the remotely operated aerial vehicle within the area that includes the one or more obstacles. The primarily flight guidance system refers to the higher resolution map to navigate the one or more obstacles. Failure of the primary flight guidance system is detected. Flight guidance is switched to the secondary flight guidance system.

The secondary flight guidance system is used (e.g., either locally or remotely, for example, via a control station) to formulate a flight path to a safer location outside of the area. The secondary flight guidance system refers to the lower resolution map to formulate the flight path. The flight path minimizing crossings between boundaries defined in the less detailed boundary geometry to bias the flight path towards safety over efficiency.

In one aspect, a remotely operated aerial vehicle is flown in the air to initiate performance a specified mission (or for recreational purposes). The primarily flight guidance system uses a higher resolution map to guide the remotely operated aerial vehicle around obstacles (e.g., buildings) within the area. During flight, a failure of the primary flight guidance system is detected.

Flight guidance is switched over to the secondary flight guidance system. The secondary flight guidance system uses a lower resolution map to navigate the remotely operated aerial vehicle to safer location (e.g., away from any vertical obstacles). For example, the secondary flight guidance system can determine a flight path to a safer location based on the lower resolution map. The flight path minimizes crossings between different minimizing crossings represented in the lower resolution map. The flight path is biased towards safety over efficiency.

As such, aspects of the invention can be used to mitigate the possibility of a remotely operated aerial vehicle damaging itself, other property, or living organisms due to a failure of a primary flight guidance system. In some aspects, a Remotely Operated Aerial Vehicle is Remotely Piloted Aircraft (RPA) (and is potentially unnamed, for example, an Unmanned Aerial Vehicle (UAV)). In some aspects, a remotely operated aerial vehicle is a rotor-based UAV that includes a plurality of rotors. In some aspects, a rotor-based UAV is a quad-rotor UAV. In other aspects, a rotor-based UAV includes five or more rotors. A rotor based UAV can use rotors for one or more of: lift, maneuvering, and to change orientation (including any of pitch, roll, and yaw), including vertical takeoff and landing ("VTOL").

Figure 1:
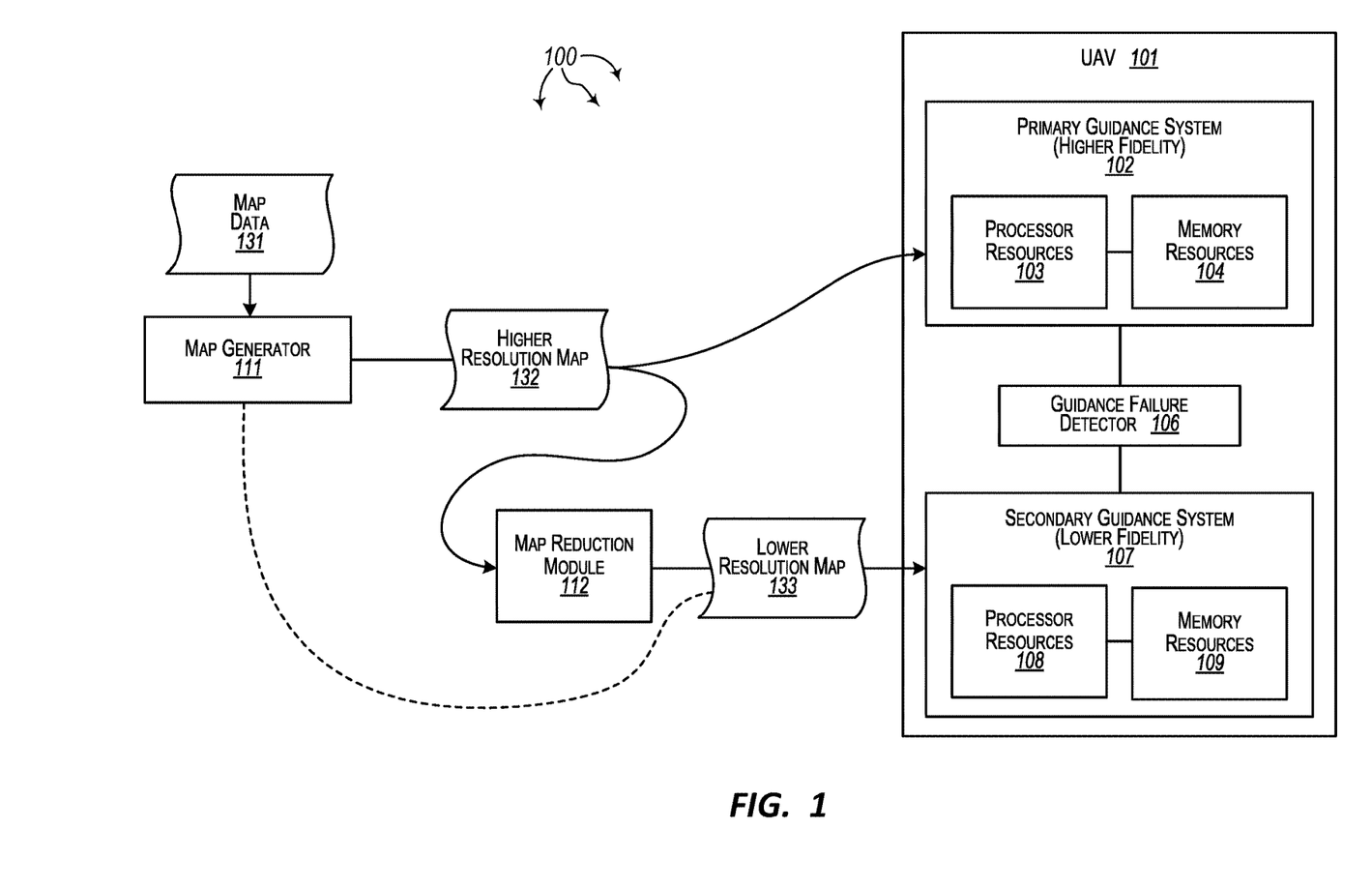
FIG. 1 illustrates an example architecture that facilitates failover navigation for a remotely operated aerial vehicle.

FIG. 1 illustrates an example architecture 100 that facilitates failover navigation for a remotely operated aerial vehicle. Turning to FIG. 1, architecture 100 includes Unmanned Aerial Vehicle (UAV) 101, map generator 111, and map reduction module 112. UAV 101 further includes primary guidance system 102 (a higher fidelity guidance system that can process higher resolution maps), secondary guidance system 107 (a lower fidelity guidance system than can process lower resolution maps), and guidance failure detector 106. Primary guidance system 102 includes processor resources 103 and memory resources 104. Secondary guidance system 107 includes processor resources 108 and memory resources 109.

UAV 101 can also include components to facilitate line of sight flight and/or past line of sight flight, such as, for example, one or more motors, components providing lift (e.g., one or more rotors), data communication components, voice radio communication components, a control system, avionics, collision avoidance components, etc.

In one aspect, processor resources 103 have superior capabilities relative to processor resources 107. For example, processor resources 103 can include more processors and/or processor cores than processor resources 107, processor resources 103 can include faster processors and/or faster processor cores than processor 107, processor resources 103 can include more onboard cache than processor resources 107, processor resources 103 can have enhanced parallel processing capabilities relative to processor resources 107, etc. Processing resources can include any of a central processing unit, an Integrated circuit ("IC"), an Application-specific integrated circuit ("ASIC"), a Field Programmable Gate Array ("FPGA"), a Graphics Processing Unit ("GPU"), a Digital Signal Processor ("DSP"), a Physics Processing Unit ("PPU"), etc.

Similarly, memory resources 104 can have superior capabilities relative to memory resources 109. For example, memory resources 104 can have greater storage capacity than memory resources 109, memory resources 104 can have faster access times than memory resources 109, etc. Memory resources can include a combination of volatile storage (e.g., Random Access Memory ("RAM"), DRAM, SRAM, T-RAM, Z-RAM, etc.) and non-volatile storage (e.g., Solid State Drives ("SSD"), optical drives, flash memory, various sizes of secure digital ("SD") cards, etc.).

Map generator 111 and map reduction module 112 can be included in and/or executed on hardware components of the same or different computer systems external to UAV 101. Map generator 111 can process map data 131 for a geographic area (e.g., map data for an area of interest or area of operation where UAV 101 is to be flown, such as, area 200). Map data 131 can be three dimensional data, including widths, lengths, and vertical heights of objects (obstacles), such as, for example, buildings, towers, monuments, mountains, cliffs, etc.

Map generator 111 can transform map data 131 into higher resolution map 132 of the geographic area. Higher resolution map 132 can include more precise (or higher precision) geometric boundaries for obstacles in the geographic area. Map reduction module 112 can deconstruct (transform) higher resolution map 132 into lower resolution map 133 of the geographic area. Alternately, map generator 111 can transform map data 131 into lower resolution map 133. Lower resolution map 133 can include less precise (or lower precision) geometric boundaries for objects in the geographic area.

The computer system used to create higher resolution map 132 and/or lower resolution map 133 can use CUDA or other parallel operations to increase efficiency. Clustered computer systems can also be used to create higher resolution map 132 and/or lower resolution map 133

Higher resolution map 132 can be loaded into primary guidance system 102 and lower resolution map 133 can be loaded into secondary guidance system 107. Maps can be loaded to UAV 101 via wired or wireless network connections between UAV 101 and the other computer system or on removable storage media or some combination thereof. UAV 101 can include ports for accepting wired connections or removable storage media. UAV 101 can also include wired or wireless network interface cards (NICs). In one aspect, removable media (e.g., an SD card) are secured within UAV 101.

Subsequent to loading maps 132 and 133, UAV 101 can be flown in the air within the geographic area. In general, primary guidance system 102 is used to insure safe operation within the geographic area. Primary guidance system 102 permits UAV 101 to make more precise maneuvers closer to other objects (obstacles) with a relative degree of safety. Guidance failure detector 106 can detect when either of primary guidance system 102 or secondary guidance system 107 fail. When either of primary guidance system 102 or secondary guidance system 107 fail, UAV 101 can be returned to a safer area of operation as quickly as possible to avoid the possibility of the other of primary guidance system 102 or secondary guidance system 107 failing prior to landing.

Figure 2:
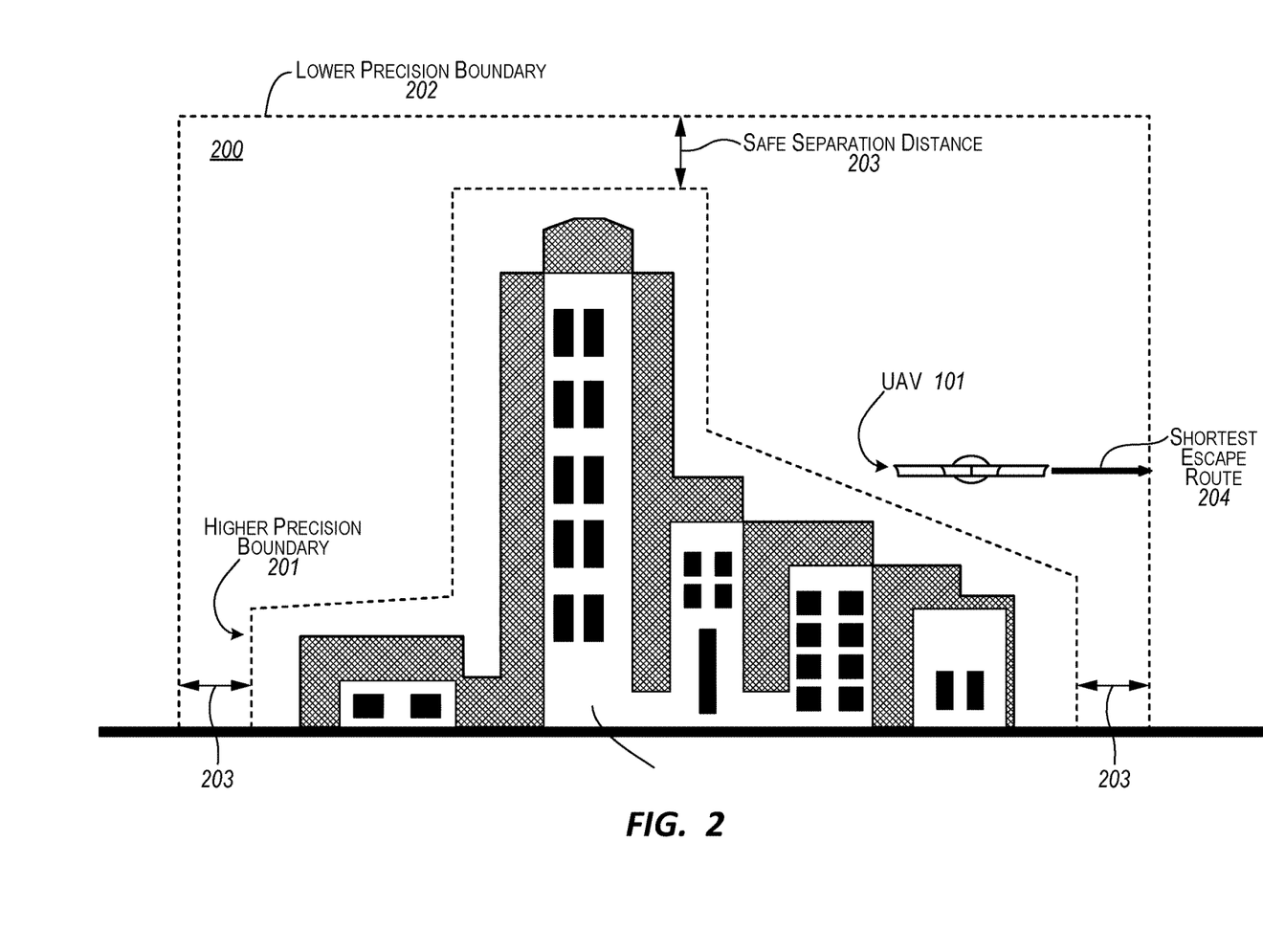
FIG. 2 illustrates an Unmanned Aerial Vehicle (UAV) flying in an example area.

FIG. 2 illustrates Unmanned Aerial Vehicle (UAV) 101 flying in area 200. As depicted, area 200 includes obstacles 211 (e.g., buildings). Higher resolution map 132 can include higher precision boundaries, such as, for example, more detailed boundary geometry, for one or more areas including area 200. For example, higher resolution map 132 can include higher precision boundary 201 for obstacles 211. Lower resolution map 133 can include lower precision boundaries, such as, for example, less detailed boundary geometry, for the one or more areas including area 200. For example, lower resolution map 133 can include lower precision boundary 202 for obstacles 211.

Figure 3:
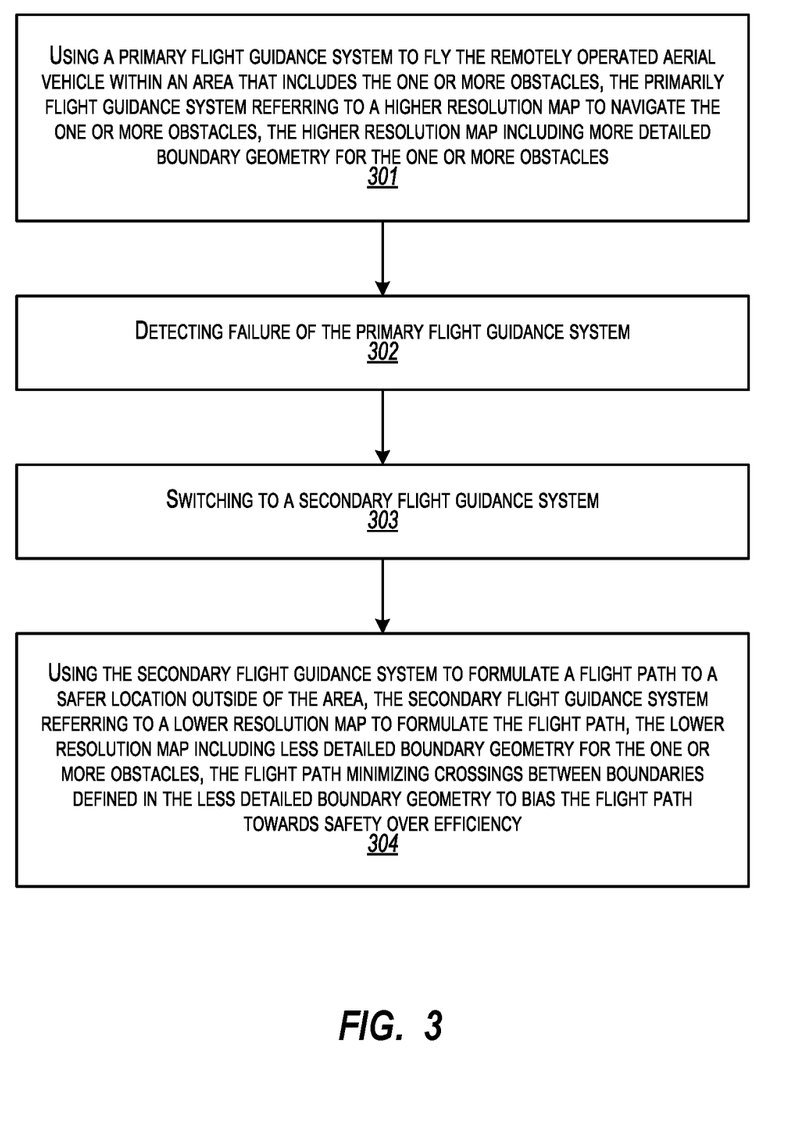
FIG. 3 illustrates a flow chart of an example method for failover navigation for a remotely operated aerial vehicle.

FIG. 3 illustrates a flow chart of an example method 300 for failover navigation for a remotely operated aerial vehicle. Method 300 will be described with respect to the data and components of architecture 100 and boundaries and distances of area 200.

Method 300 includes using a primary flight guidance system to fly the remotely operated aerial vehicle within an area that includes the one or more obstacles, the primarily flight guidance system referring to a higher resolution map to navigate the one or more obstacles, the higher resolution map including more detailed boundary geometry for the one or more obstacles (301). For example, UAV 101 can use primary guidance system 102, UAV 101 to fly within area 200 that includes obstacles 211. Primary guidance system 102 can refer to higher resolution map 132, including higher precision boundary 201 (i.e., more detailed boundary geometry), to navigate obstacles 211.

Method 300 includes detecting failure of the primary flight guidance system (302). For example, guidance failure detector 106 can detect failure of primary guidance system 102 while UAV 101 is flying in area 200. Method 300 includes switching to a secondary flight guidance system (303). For example, guidance failure detector 106 can switch flight control for UAV 101 to secondary guidance system 107.

Method 300 includes using the secondary flight guidance system to formulate a flight path to a safer location outside of the area, the secondary flight guidance system referring to a lower resolution map to formulate the flight path, the lower resolution map including less detailed boundary geometry for the one or more obstacles, the flight path minimizing crossings between boundaries defined in the less detailed boundary geometry to bias the flight path towards safety over efficiency (304). For example, UAV 101 can use secondary guidance system 107 to formulate shortest escape route 204. Shortest escape route 204 is a route to a safer location outside of area 200. Secondary guidance system 107 can refer to lower resolution map 133, including lower precision boundary 202 (i.e., less detailed boundary geometry), to formulate shortest escape route 204.

Shortest escape route 204 minimizes crossing between boundaries defined in lower resolution map 133. For example, UAV 101 crosses lower precision boundary 202 once to safely move to another area outside of area 200. The other area can have fewer obstacles, less dangerous obstacles, etc. In one aspect, a flight path to a safer location can be biased towards safety over efficiency. For example, a formulated flight path may be a longer distance in order to minimize (and possibly avoid) crossing additional boundaries. That is, a longer flight path that crosses fewer boundaries can be preferred over a shorter flight path that crosses more boundaries. Secondary guidance system 107 can utilize a safety bias when formulating flight paths to safer locations.

In one aspect, a formulated flight path to a safer location is a flight path to a landing area (or other safe area) for maintenance. Part of a formulated flight path can include how to maneuver UAV 101 outside of lower precision boundary 202. Flying outside of lower precision boundary 202 insures that UAV 101 maintains at least safe separation distance 203 from obstacles 211. Once outside of lower precision boundary 202, UAV 101 can return to a landing area (or other safe location) for maintenance.

A formulated flight path can include flying one or more skyways (or along a city skyline) that are known to be clear of obstacles. For example, UAV 101 can fly up until UAV 101 is at least safe separation distance 203 above the highest obstacle in area 200. UAV can then fly towards a safer area. Accordingly, a formulated flight path to a safer area can include moving in three dimensions, up, down, east, west, north, south. A formulated flight path can also include changing the orientation of UAV 101 to fit within a specified area.

Figure 4:
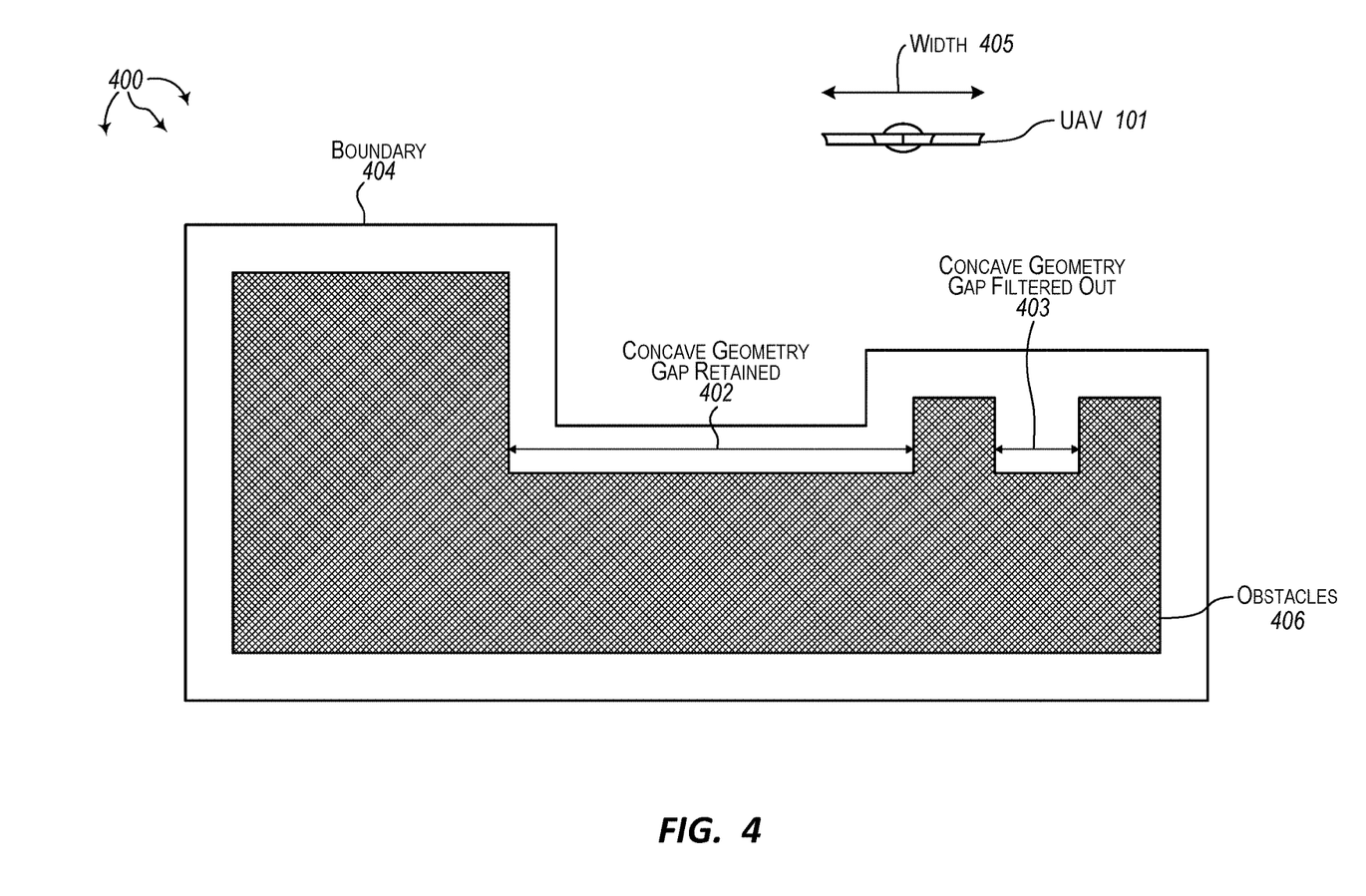
FIG. 4 illustrates an Unmanned Aerial Vehicle (UAV) flying in another example area.

Map creation can account for the external dimensions of UAV 101. Turning to FIG. 4, FIG. 4 illustrates Unmanned Aerial Vehicle (UAV) 101 flying in another area 400. A map (e.g., a higher resolution map) can include boundary 404 for obstacles 406. Based on width 405 of UAV 101, map generator 111 can filter out concave geometry gap 403 from boundary 404. On the other hand, based on width 405 of UAV 101, map generator 111 can retain a representation of concave geometry gap 402 in boundary 404.

In general, UAV 101 can fly in three-dimensional space. Although depicted in two dimesons, maps, such as, for example, maps 132 and 133, can be of three-dimensional space where UAV 101 is to fly. Boundaries around obstacles can be represented by bounding volumes.

In one aspect, a convex patching algorithm is used to transform map data into a higher resolution map. A lower resolution map can be created from the higher resolution map or from the map data. Using the higher resolution map to create the lower resolution map can mitigate possible reentrant "crags" in the lower resolution map. Convex hull, polygonal approximation, quad trees, graphs, bounding volumes, etc. can be used to create maps from map data.

In one aspect, a higher resolution map can be on the order of multiple tens of megabytes in size. A lower resolution map can be on the order of multiple hundreds of kilobytes in size.

A map can represent a deconstructed geometry of a complex shape (e.g., a city skyline) breaking into down into polygonal approximations that capture the relevant features of that shape in a more conservative fashion.

Use of secondary guidance system 107 can comply with regulations of regulatory agencies, such as, for example, Federal Aviation Administration (FAA), Transport Canada Civil Aviation (TCCA), European Aviation Safety Agency (EASA), Civil Aviation Administration of China (CAAC), etc. Thus, UAVs (or other remotely operated aerial vehicles) with secondary guidance system 107 or a similar backup guidance system may qualify for past line of site flight in these jurisdictions.

In general, analog and/or digital systems can be used to monitor and control remotely operated aerial vehicles (e.g., UAV 101). Monitoring and control equipment can be co-located with and/or separate one another. Information exchanged between remotely operated aerial vehicles and monitoring and control equipment can be relayed over a wired and/or wireless communication networks. As such, analog and/or digital systems can be used to monitor guidance systems used for remotely operated aerial vehicles. In some embodiments, analog and/or digital monitoring systems can also implement remediating measures to switch between guidance systems. For example, a monitoring system can switch between primary guidance system 102 and secondary guidance system 107.

Remotely operated aerial vehicles can include computer network connectivity components (e.g., a Network Interface Card ("NIC") or cellular modem) for wired or wirelessly connecting the monitoring and control equipment to a computer network. As such, modules, algorithms, components, etc., for guiding a remotely operated aerial vehicle, monitoring and switching between guidance systems at a remotely operated aerial vehicle, and controlling the flight of remotely operated aerial vehicles (e.g., direction, speed, acceleration, pitch, yaw, roll) can also be connected to other modules, algorithms, components, etc., over (or be part of) a network, such as, for example, a Local Area Network ("LAN"), a Wide Area Network ("WAN"), and even the Internet. Accordingly, the modules, algorithms, components, etc., for guiding a remotely operated aerial vehicle and also monitoring and switching between guidance systems at a remotely operated aerial vehicle as well as any other connected computer systems and their components (e.g., in a control or command center), can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

A remotely operated aircraft can be operated by an operator (e.g., a certified pilot) from a control station. In one aspect, the operator can use the control station to fly the remotely operated aircraft past line of sight. The remotely operated aircraft can be certified for past line of sight flight by appropriate government and/or regulatory authorities, such as, for example, the Federal Aviation Administration (FAA), Transport Canada Civil Aviation (TCCA), European Aviation Safety Agency (EASA), Civil Aviation Administration of China (CAAC), etc. for the country in which it is operating. Input devices can include keyboards, mice, flight sticks, etc manned, for example, by a vehicle operator (e.g., pilot). Output devices can include display devices and speakers or head phones.

Alternately, a remotely operated aerial vehicle may operate autonomously (e.g., to perform a specified mission). In some aspects, a remotely operated aerial vehicle operates autonomously with an operator (e.g., pilot) taking control under specified conditions (e.g., component failures, as requested by a control center, upon detecting failure of a primary guidance system, upon switching over to a secondary guidance system, etc.)

Aspects of the invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Aspects of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between different formats, such as, for example, from map data to higher and/or lower resolution maps.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, map data, higher resolution maps, and lower resolution maps.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system, the computer system comprising one or more processors;
    system memory coupled to the one or more processors, the system memory storing instructions that are executable by the one or more processors; and
    the one or more processors executing the instructions stored in the system memory to fly a remotely operated aerial vehicle among one or more obstacles, including the following:
        use a primary flight guidance system to fly the remotely operated aerial vehicle within an area that includes the one or more obstacles, the primarily flight guidance system referring to a higher resolution map to navigate the one or more obstacles, the higher resolution map including more detailed boundary geometry for the one or more obstacles;
        detect failure of the primary flight guidance system;
        switch to a secondary flight guidance system; and
        use the secondary flight guidance system to formulate a flight path to a safer location outside of the area, the secondary flight guidance system referring to a lower resolution map to formulate the flight path, the lower resolution map including less detailed boundary geometry for the one or more obstacles, the flight path minimizing crossings between boundaries defined in the less detailed boundary geometry to bias the flight path towards safety of the remotely operated aerial vehicle over efficiency of the remotely operated aerial vehicle.

2. The computer system of claim 1, further comprising the one or more processors executing the instructions stored in the system memory to:
    load the higher resolution map from another computer system into resources of the primary flight guidance system; and
    load the lower resolution map from the other computer system into resources of the secondary flight guidance system.

3. The computer system of claim 2, wherein the one or more processors executing the instructions stored in the system memory to load the higher resolution map comprises the one or more processors executing the instructions stored in the system memory to load a map that has concave geometry filtered out based on external dimensions of the remotely operated aerial vehicle.

4. The computer system of claim 2, wherein the one or more processors executing the instructions stored in the system memory to load the lower resolution map comprises the one or more processors executing the instructions stored in the system memory to load a map that was deconstructed from the more detailed boundary geometry.

5. The computer system of claim 1, wherein the one or more processors executing the instructions stored in the system memory to use a primary flight guidance system to fly the remotely operated aerial vehicle comprises the one or more processors executing the instructions stored in the system memory to refer to a map that has concave geometry filtered out based on external dimensions of the remotely operated aerial vehicle.

6. The computer system of claim 1, wherein the one or more processors executing the instructions stored in the system memory to use the secondary flight guidance system to formulate a flight path to a safe location outside of the area comprises the one or more processors executing the instructions stored in the system memory to refer to a map that was deconstructed from the more detailed boundary geometry.

7. The computer system of claim 1, wherein the one or more processors executing the instructions stored in the system memory to use the secondary flight guidance system to formulate a flight path to a safer location outside of the area comprises the one or more processors executing the instructions stored in the system memory to refer to a map that defines a safe separation distance from the one or more obstacles.

8. The computer system of claim 1, wherein the one or more processors executing the instructions stored in the system memory to use the secondary flight guidance system to formulate a flight path to a safer location outside of the area comprises the one or more processors executing the instructions stored in the system memory to determine the shortest route out of the less detailed boundary geometry.

9. A method for use at a computer system, the method for flying a remotely operated aerial vehicle among one or more obstacles, the method comprising:
using a primary flight guidance system to fly the remotely operated aerial vehicle within an area that includes the one or more obstacles, the primarily flight guidance system referring to a higher resolution map to navigate the one or more obstacles, the higher resolution map including more detailed boundary geometry for the one or more obstacles;
detecting failure of the primary flight guidance system;
switching to a secondary flight guidance system; and
using the secondary flight guidance system to formulate a flight path to a safer location outside of the area, the secondary flight guidance system referring to a lower resolution map to formulate the flight path, the lower resolution map including less detailed boundary geometry for the one or more obstacles, the flight path minimizing crossings between boundaries defined in the less detailed boundary geometry to bias the flight path towards safety of the remotely operated aerial vehicle over efficiency of the remotely operated aerial vehicle.

10. The method of claim 9, further comprising:
loading the higher resolution map from another computer system into resources of the primary flight guidance system; and
loading the lower resolution map from the other computer system into resources of the secondary flight guidance system.

11. The method of claim 10, wherein loading the higher resolution map comprises loading a map that has concave geometry filtered out based on external dimensions of the remotely operated aerial vehicle.

12. The method of claim 10, wherein loading the lower resolution map comprises loading a map that was deconstructed from the more detailed boundary geometry.

13. The method of claim 9, wherein using a primary flight guidance system to fly the remotely operated aerial vehicle comprises referring to a map that has concave geometry filtered out based on external dimensions of the remotely operated aerial vehicle.

14. The method of claim 9, wherein using the secondary flight guidance system to formulate a flight path to a safer location outside of the area comprises referring to a map that was deconstructed from the more detailed boundary geometry.

15. The method of claim 9, wherein using the secondary flight guidance system to formulate a flight path to a safer location outside of the area comprises referring to a map that defines a safe separation distance from the one or more obstacles.

16. The method of claim 9, wherein using the secondary flight guidance system to formulate a flight path to a safer location outside of the area comprises determining the shortest route out of the less detailed boundary geometry.

17. A remotely operated aerial vehicle, the remotely operated aerial vehicle comprising one or more processors;
system memory coupled to the one or more processors, the system memory storing instructions that are executable by the one or more processors;
a primary flight guidance system running in a first portion of the system memory;
a higher resolution map of an area including one or more obstacles, the higher resolution map loaded into system memory associated with the primary flight guidance system, the higher resolution map including more detailed boundary geometry for the one or more obstacles;
a secondary flight guidance system running in a second portion of the system memory;
a lower resolution map of the area including one or more obstacles, the lower resolution map loaded into system memory associated with the secondary flight guidance system, the lower resolution map including less detailed boundary geometry for the one or more obstacles; and
the one or more processors executing the instructions stored in the system memory to fly the remotely operated aerial vehicle among the one or more obstacles, including the following:
use the primary flight guidance system to fly the remotely operated aerial vehicle within the area, the primarily flight guidance system referring to the higher resolution map to navigate the one or more obstacles;
detect failure of the primary flight guidance system;
switch to a secondary flight guidance system; and
use the secondary flight guidance system to formulate a flight path to a safer location outside of the area, the secondary flight guidance system referring to the lower resolution map to formulate the flight path, the flight path minimizing crossings between boundaries defined in the less detailed boundary geometry to bias the flight path towards safety of the remotely operated aerial vehicle over efficiency of the remotely operated aerial vehicle.

18. The remotely operated aerial vehicle of claim 17, wherein the one or more processors executing the instructions stored in the system memory to use the primary flight guidance system to fly the remotely operated aerial vehicle comprises the one or more processors executing the instructions stored in the system memory to refer to a map that has concave geometry filtered out based on external dimensions of the remotely operated aerial vehicle.

19. The remotely operated aerial vehicle of claim 17, wherein the one or more processors executing the instructions stored in the system memory to use the secondary flight guidance system to formulate a flight path to a safer location outside of the area comprises the one or more processors executing the instructions stored in the system memory to refer to a map that was deconstructed from the more detailed boundary geometry to determine the shortest route out of the less detailed boundary geometry.

20. The remotely operated aerial vehicle of claim 17, further comprising a plurality of rotors used to maneuver the remotely operated aerial vehicle among the one or more obstacles.

* * * * *